United States Patent
Ke

(10) Patent No.: US 11,176,033 B2
(45) Date of Patent: Nov. 16, 2021

(54) DATA STORAGE DEVICES AND DATA PROCESSING METHODS

(71) Applicant: Silicon Motion, Inc., Jhubei (TW)

(72) Inventor: Kuan-Yu Ke, Zhubei (TW)

(73) Assignee: SILICON MOTION, INC., Jhubei (TW)

( * ) Notice: Subject to any disclaimer, the term of this patent is extended or adjusted under 35 U.S.C. 154(b) by 48 days.

(21) Appl. No.: 16/849,294

(22) Filed: Apr. 15, 2020

(65) Prior Publication Data

US 2020/0371910 A1 Nov. 26, 2020

(30) Foreign Application Priority Data

May 20, 2019 (TW) ................................. 108117322

(51) Int. Cl.
 *G06F 12/02* (2006.01)
 *G06F 12/0882* (2016.01)
 *G06F 12/0804* (2016.01)
 *G06F 13/16* (2006.01)
 *G06F 12/0873* (2016.01)

(52) U.S. Cl.
 CPC ...... *G06F 12/0246* (2013.01); *G06F 12/0804* (2013.01); *G06F 12/0873* (2013.01); *G06F 12/0882* (2013.01); *G06F 13/1668* (2013.01); *G06F 2212/7201* (2013.01)

(58) Field of Classification Search
 None
 See application file for complete search history.

(56) References Cited

U.S. PATENT DOCUMENTS

| | | | |
|---|---|---|---|
| 2008/0228995 A1* | 9/2008 | Tan | G06F 21/32 711/103 |
| 2019/0188125 A1* | 6/2019 | Lin | G06F 3/0652 |
| 2019/0220416 A1* | 7/2019 | Jung | G06F 12/1009 |
| 2020/0057725 A1* | 2/2020 | Cho | G06F 12/0246 |
| 2020/0065241 A1* | 2/2020 | Cho | G11C 11/4082 |

* cited by examiner

*Primary Examiner* — Kevin Verbrugge
(74) *Attorney, Agent, or Firm* — McClure, Qualey & Rodack, LLP

(57) ABSTRACT

A data storage device includes a memory device and a memory controller. The memory controller selects a predetermined memory block to receive data and accordingly records multiple logical addresses in a first mapping table. When the predetermined memory block is full, the memory controller edits a second mapping table or a third mapping table based on the first mapping table. The memory controller determines whether the first mapping table has recorded logical addresses of a predetermined number of consecutive logical pages. If not, the memory controller edits the second mapping table. If so, the memory controller skips editing the second mapping table and edits the third mapping table instead, so as to record the mapping information of a predetermined logical page among the predetermined number of consecutive logical pages as representative mapping information in a corresponding field of the third mapping table.

16 Claims, 8 Drawing Sheets

DATA STORAGE DEVICES AND DATA PROCESSING METHODS

CROSS REFERENCE TO RELATED APPLICATIONS

This Application claims priority of Taiwan Patent Application No. 108117322, filed on May 20, 2019, the entirety of which is incorporated by reference herein.

BACKGROUND OF THE INVENTION

Field of the Invention

The invention relates to a data storage device and a data processing method, which is capable of speeding up the write operation of a memory device.

Description of the Related Art

With the rapid growth of data storage technology in recent years, many data storage devices—such as memory cards manufactured in compliance with the SD/MIVIC standards, CF standards, MS standards or XD standards, as well as solid state hard drives, Embedded Multi Media Cards (eMMC) and Universal Flash Storage (UFS)—have been used widely for a variety of purposes. Therefore, effective control of access to these data storage devices is an important issue.

In order to improve the access performance of the data storage device, a novel data processing method which is capable of effectively processing the data stored in the memory device and improving the access performance of the memory device is proposed.

BRIEF SUMMARY OF THE INVENTION

Data storage devices and data processing methods are provided. An exemplary embodiment of a data storage device comprises a memory device and a memory controller. The memory controller comprises a plurality of memory blocks, and each memory block comprises a plurality of physical pages. The memory controller is coupled to the memory device and configured to access the memory device. The memory controller is configured to select a predetermined memory block to receive data and accordingly record a plurality of logical addresses in a first mapping table. The memory controller comprises a buffer memory, the first mapping table is stored in the buffer memory and records which logical page the data stored in each physical page of the predetermined memory block is directed to. When the predetermined memory block is full, the memory controller is configured to edit a second mapping table or a third mapping table based on the first mapping table. The second mapping table corresponds to a plurality of logical pages and records mapping information of the corresponding logical pages. The memory controller further determines whether the first mapping table has recorded logical addresses of a predetermined number of consecutive logical pages. When the memory controller determines that the first mapping table has not recorded the logical addresses of the predetermined number of consecutive logical pages, the memory controller is configured to edit the second mapping table based on the first mapping table. When the memory controller determines that the first mapping table has recorded the logical addresses of the predetermined number of consecutive logical pages, the memory controller is configured to skip editing of the second mapping table and edit the third mapping table based on the first mapping table instead, so as to record the mapping information of a predetermined logical page among the predetermined number of consecutive logical pages as representative mapping information in a corresponding field of the third mapping table. The second mapping table comprises a plurality of fields, one field of the second mapping table is configured to record the mapping information of one logical page, the fields of the second mapping table are grouped into a plurality of groups, and the third mapping table is configured to record management information of the groups of the second mapping table. When the memory controller is configured to edit the third mapping table based on the first mapping table, the memory controller is configured to replace the management information of the group corresponding to the predetermined number of consecutive logical pages with the representative mapping information, and wherein the predetermined number is a positive integer greater than 1.

An exemplary embodiment of a data processing method for a data storage device comprising a memory device and a memory controller, wherein the memory device comprises a plurality of memory blocks, each memory block comprises a plurality of physical pages, and the memory controller is coupled to the memory device and configured to access the memory device. The method is performed by the memory controller and comprises: selecting a predetermined memory block to receive data and accordingly record a plurality of logical addresses in a first mapping table, wherein the first mapping table is stored in a buffer memory of the memory controller and records which logical page the data stored in each physical page of the predetermined memory block is directed to; and when the predetermined memory block is full, editing a second mapping table or a third mapping table based on the first mapping table. The second mapping table corresponds to a plurality of logical pages and records mapping information of the corresponding logical pages. The step of editing a second mapping table or a third mapping table based on the first mapping table further comprises: determining whether the first mapping table has recorded logical addresses of a predetermined number of consecutive logical pages; when the first mapping table has not recorded the logical addresses of the predetermined number of consecutive logical pages, editing the second mapping table based on the first mapping table; and when the first mapping table has recorded the logical addresses of the predetermined number of consecutive logical pages, skip editing of the second mapping table and edit the third mapping table based on the first mapping table instead, so as to record the mapping information of a predetermined logical page among the predetermined number of consecutive logical pages as representative mapping information in a corresponding field of the third mapping table. The second mapping table comprises a plurality of fields, one field of the second mapping table records the mapping information of one logical page, the fields of the second mapping table are grouped into a plurality of groups, and the third mapping table records management information of the groups of the second mapping table. When editing the third mapping table based on the first mapping table, the management information of the group corresponding to the predetermined number of consecutive logical pages is replaced by the representative mapping information, and wherein the predetermined number is a positive integer greater than 1.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

In order to make the objects, features and advantages of the invention more comprehensible, specific embodiments of the invention are set forth in the accompanying drawings. This description is made for the purpose of illustrating the general principles of the invention and should not be taken in a limiting sense. It should be understood that the following embodiments can be implemented by software, hardware, firmware, or any combination thereof. The scope of the invention is determined by reference to the appended claims.

Figure 1:
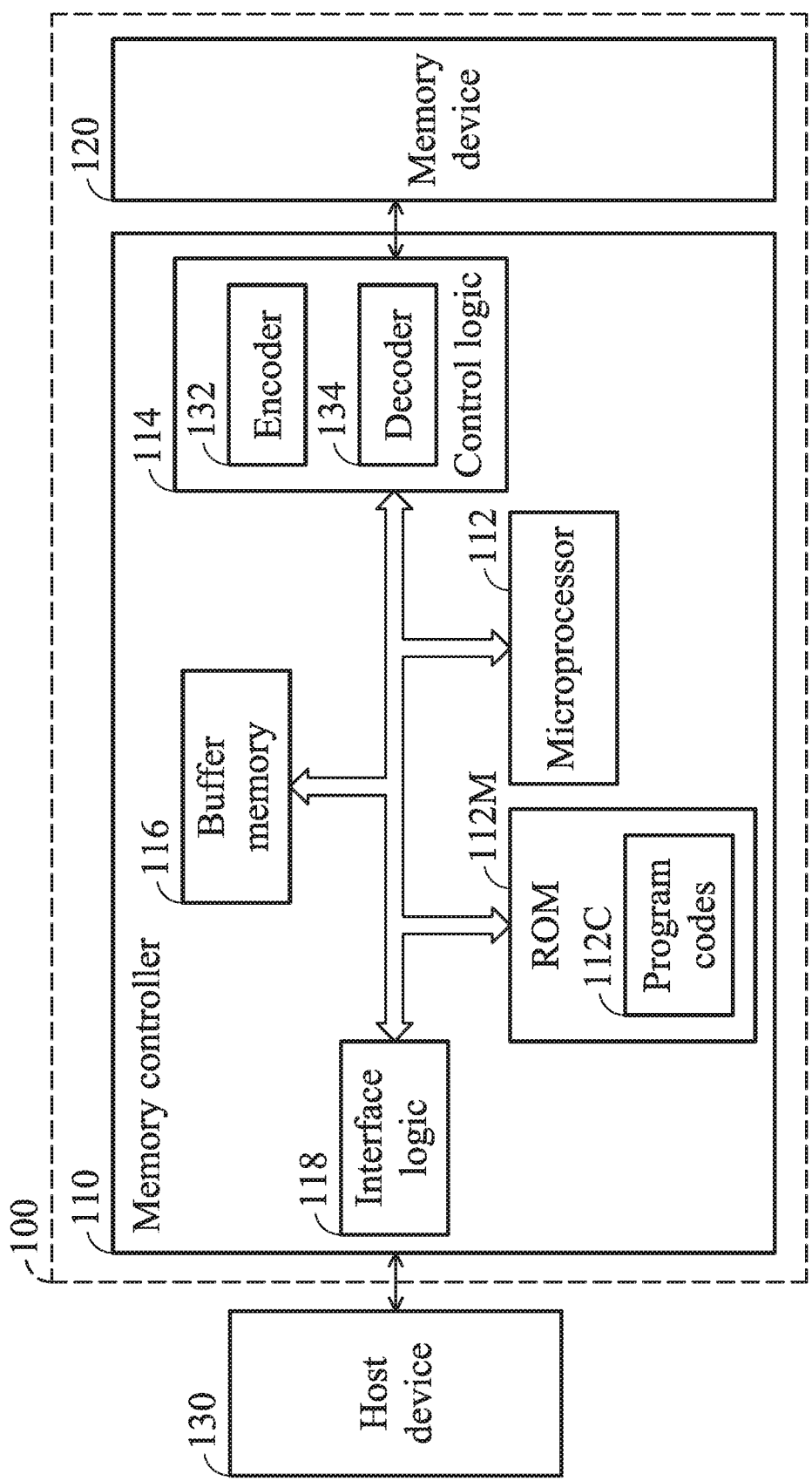
FIG. 1 shows an exemplary block diagram of a data storage device according to an embodiment of the invention.

FIG. 1 shows an exemplary block diagram of a data storage device according to an embodiment of the invention. The data storage device 100 may comprise a memory device 120, such as a flash memory module, and a memory controller 110. The memory controller 110 is configured to access the memory device 120. According to an embodiment of the invention, the memory controller 110 may comprise a microprocessor 112, a Read Only Memory (ROM) 112M, a control logic 114, a buffer memory 116 and an interface logic 118. The ROM 112M is configured to store program codes 112C. The microprocessor 112 is configured to execute the program codes 112C, thereby controlling access to the memory device 120. The control logic 114 may comprise an encoder 132 and a decoder 134. The encoder 132 is configured to encode the data to be written into the memory device 120 so as to generate corresponding correcting/checking code (also called error correction code (ECC)). The decoder 134 is configured decode the data read out from the memory device 120.

Typically, the memory device 120 may comprise a plurality of flash memory chips, and each flash memory chip may comprise a plurality of memory blocks. The access unit of an erase operation performed by the controller (e.g., the memory controller 110, through the execution of the program codes 112C by the microprocessor 112) on the memory device 120 may be one memory block. In addition, a memory block may record (comprise) a predetermined number of pages, that is, the physical pages, and the access unit of a write operation performed by the controller (e.g., the memory controller 110, through the execution of the program codes 112C by the microprocessor 112) on the memory device 120 may be one page.

In practice, the memory controller 110 may perform various control operations using its own internal components through the execution of the program codes 112C by the microprocessor 112. For example, the memory controller 110 may use the control logic 114 to control the access operations (especially the access operation for at least a memory block or at least a page) of the memory device 120, use the buffer memory 116 to perform necessary data buffer operations, and use the interface logic 118 to communicate with a host device 130. In an embodiment of the invention, the memory controller 110 may use the interface logic 118 to communicate with a host device 130 in compliance with a standard communication protocol. For example, the standard communication protocol may comprise (but is not limited to) the Universal Serial Bus (USB) standard, the Secure Digital (SD) interface standard, the Ultra High Speed-I (UHS-I) interface standard, the Ultra High Speed-II (UHS-II) interface standard, the Compact Flash (CF) interface standard, the Multimedia Card (MMC) interface standard, the Embedded Multimedia Card (eMMC) interface standard, the Universal Flash Storage (UFS) interface standard, the Advanced Technology Attachment (ATA) standard, the Serial ATA (SATA) standard, the Peripheral Component Interconnect Express (PCI-E) standard, the Parallel Advanced Technology Attachment (PATA) standard, etc.

In an embodiment, the buffer memory 116 may be implemented by a Random Access Memory (RAM). For example, the buffer memory 116 may be an SRAM, but the invention should not be limited thereto.

In an embodiment of the invention, the data storage device 100 may be a portable storage device (for example, the memory card in compliance with the SD/MMC, CF, MS and/or XD standard), and the host device 130 may be an electronic device, such as a mobile phone, a notebook computer, a desktop computer... etc., capable of connecting to the data storage device. In another embodiment of the invention, the data storage device 100 may be a solid state hard disk or an embedded storage device in compliance with the Universal Flash Storage (UFS) or the Embedded Multi Media Card (EMMC) standards, and may be equipped in an electronic device such as a mobile phone, a notebook computer, or a desktop computer. In such an embodiment, the host device 130 may be a processor of the electronic device.

The host device 130 may issue commands, such as the read command or the write command, to the data storage device 100, so as to access the data stored in the memory device 120, or the host device 130 may issue commands to further control or manage the data storage device 100.

According to an embodiment of the invention, the memory blocks comprised in the memory device 120 may be configured as the Single-Level Cell (SLC) memory blocks, the Multiple-Level Cell (MLC) memory blocks and/or the Triple-Level Cell (TLC) memory blocks. The memory cell of the SLC memory block is configured to store one bit data, the memory cell of the MLC memory block is configured to store two bits data, and the memory cell of the TLC memory block is configured to store three bits data.

Generally, the memory device 120 may be divided into three regions, comprising a system region, a data region and a spare region. The memory controller 110 is configured to select a predetermined memory block from the spare region as a cache memory, or called a buffer, to receive data and buffer the data. When the predetermined memory block (that is, the buffer) is full (that is, has been fully written with data), the memory controller may further update the predetermined memory block currently being utilized as a buffer as a data block in the data region. For example, when the predetermined memory block currently being utilized as a buffer to receive data is an MLC or a TLC memory block, when the buffer is full, the predetermined memory block may be directly updated as a data block in the data region. When the predetermined memory block currently being utilized as a buffer to receive data is an SLC memory block, when a predetermined number of buffers are full, the memory controller may perform a garbage collection procedure to move the data stored in the buffers to an MLC or a TLC memory block (the destination memory block) and update the destination memory block as a data block in the data region.

According to an embodiment of the invention, the memory controller 110 is configured to maintain a first mapping table in the buffer memory 116. When using the predetermined memory block to receive data, the memory controller 110 is configured to accordingly record a plurality of logical addresses in the first mapping table. According to an embodiment of the invention, the first mapping table is a Flash to Host (F2H) mapping table, or called Physical to Logical (P2L) mapping table. The first mapping table comprises a plurality of fields. One field records the corresponding mapping information of one physical page of the predetermined memory block. That is, each field in the first mapping table Table_1 records which logical page the data stored in the corresponding physical page of the predetermined memory block is directed to (corresponding to). For example, the first mapping table may record the Logical Block Address (LBA) of a corresponding logical page, or may record the logical address of a logical page in other format.

According to an embodiment of the invention, the first mapping table records the logical addresses in the form of an array. A field in the array of the first mapping table corresponds to a physical page of the predetermined memory block. That is, the value of the array index of the first mapping table has a one-to-one mapping relationship with the index or the page number of the physical page of the predetermine memory block. For example, suppose that a starting array index of the first mapping table is 0, the logical address recorded in the first record in the first mapping table Table_1, that is, Table_1[0], is the address of the logical page that the data stored in the first physical page of the predetermined memory block is directed to. Similarly, the logical address recorded in the second record in the first mapping table Table_1, that is, Table_1[1], is the address of the logical page that the data stored in the second physical page of the predetermined memory block is directed to, and so on.

According to an embodiment of the invention, the memory controller 110 may sequentially write the data into the physical pages of the predetermined memory block according to the physical page number in an ascending manner. Therefore, the memory controller 110 may also record the logical address of the logical page corresponding to each physical page of the predetermined memory block in the first mapping table Table_1 according to the array index in an ascending manner. However, it should be noted that the invention is not limited to program the predetermined memory block according to the physical page number in an ascending manner.

According to an embodiment of the invention, when the predetermined memory block is full, the edition of the first mapping table Table_1 is completed, accordingly. Theoretically, the first mapping table Table_1 records the latest Flash to Host mapping information. When the memory controller 110 finishes the edition of the first mapping table Table_1, the memory controller 110 is configured to edit the second mapping table Table_2 according to the content recorded in the first mapping table Table_1, so as to update the latest mapping information to the second mapping table Table_2.

According to an embodiment of the invention, the second mapping table Table_2 may be stored in the system region of the memory device 120. The second mapping table Table_2 may be a Host to Flash (H2F) mapping table, or called a Logical to Physical (L2P) mapping table. The data recorded in the second mapping table Table_2 corresponds to a plurality of logical pages. Generally, the number of fields comprised in the second mapping table Table_2 is related to the number of logical pages comprised in the system of the host device 130, where one field of the second mapping table Table_2 corresponds to one logical page of the host device system, so as to record the mapping information of the corresponding logical page. That is, each field in the second mapping table Table_2 records which memory block and which physical page the data of the corresponding logical page is directed to (in other words, which memory block and which physical page the data of the corresponding logical page is stored in). According to an embodiment of the invention, the host device system may be a system comprising the host device 130 and the data storage device 100, or may be a system further comprising one or more peripheral devices coupled to the host device 130.

According to an embodiment of the invention, the second mapping table Table_2 may record a memory block number and a page number that correspond to each logical page in the form of an array, so as to record which memory block and which physical page data of each logical page is directed to (that is, which memory block and which physical page the data of each logical page is stored in). As discussed above, one field of the second mapping table Table_2 corresponds to one logical page. Therefore, the value of the array index of the second mapping table has a one-to-one mapping relationship with the index or the number of the logical page. For example, suppose that a starting array index of the second mapping table Table_2 is 0, the memory block number and the page number recorded in the first field of the second mapping table Table_2 (that is, the first record Table_2[0] recorded in the second mapping table Table_2), is the physical memory block number and the physical page number that the data of the first logical page of the host device system is stored in, the memory block number and the page number recorded in the second field of the second mapping table Table_2, (that is, the second record Table_2[1] recorded in the second mapping table Table_2), is the physical memory block number and the physical page number that the data of the second logical page of the host device system is stored in, and so on.

According to an embodiment of the invention, when editing the second mapping table Table_2, the memory controller 110 is configured to start from the starting array index of the first mapping table Table_1 to sequentially check the logical addresses recorded in the first mapping table Table_1, and look up the information stored in the second mapping table Table_2 according to the logical addresses recorded in the first mapping table to find content recorded in corresponding positions of the second mapping table Table_2. The memory controller 110 is further configured to update the content recorded in the second mapping table Table_2 according to the memory block number of the predetermined memory block and a corresponding array index of the first mapping table Table_1.

For example, the content recorded in the first field of the first mapping table Table_1 Table_1[0] is 0, which means that the data stored in the first physical page of the predetermined memory block is directed to the logical page with the logical address 0. The memory controller 110 then looks up content of the second mapping table Table_2 according to this logical address and loads one or a plurality of records including the record of this logical address into the buffer memory 116, so as to edit or update the content of the second mapping table Table_2. For example, the memory controller 110 may access the $1^{st}$ to $1024^{th}$ records recorded in the second mapping table Table_2 and load the content of the $1^{st}$ to $1024^{th}$ records into the buffer memory 116. Then, the memory controller 110 may update the content of the second mapping table Table_2 according to the memory block number of the predetermined memory block and a corresponding array index of the first mapping table Table_1. It should be noted that since the portion of the second mapping table Table_2 loaded in the buffer memory 116 for content updating or editing is a copy of the second mapping table Table_2 stored in the memory device 120. Therefore, in the embodiments of the invention, the portion of the second mapping table Table_2 loaded in the buffer memory 116 is also referred to as the second mapping table Table_2.

In addition, it should be noted that before the memory controller 110 has to read other records recorded in the second mapping table Table_2 (for example, the $1025^{th}$ to $2048^{th}$ records) or when the memory controller 110 determines that the content of the second mapping table Table_2 has been updated, the memory controller 110 is configured to write the content of the second mapping table Table_2 buffered in the buffer memory 116 back to the system region of the memory device 120, so as to update the content of the second mapping table Table_2 in the memory device 120, and/or further load some other records of the second mapping table Table_2 into the buffer memory 116.

According to an embodiment of the invention, since the number of fields comprised in the second mapping table Table_2 is related to the number of logical pages comprised in the host device system, the second mapping table Table_2 stored in the memory device 120 may actually across a plurality of physical pages. For example, suppose that the size of a host page (HP) or the size of one logical page is set to 4K Bytes, and the size required by each field of the second mapping table Table_2 is 4 Bytes, meaning that each field of the second mapping table Table_2 uses 4 Bytes to record the corresponding data, and the size of one physical page is 16K Bytes, then one physical page can record the information of 4K fields. That is, one physical page can record the mapping information of 4K logical pages (logical addresses), and the amount of data will be 4K*4KB=16 MB (Mega Bytes). Therefore, for the memory device 120 having a capacity (that is, memory size) of 256 G Bytes, the size of the second mapping table Table_2 has to be maintained will be 256 MB, which is equal to 16384(16K) physical pages.

Since the second mapping table Table_2 stored in the memory device 120 may actually across a plurality of physical pages, according to an embodiment of the invention, the memory controller 110 may establish a third mapping table Table_3 in the memory device 120 for recording the management information of the second mapping table Table_2, which is helpful for the memory controller 110 to manage the second mapping table Table_2. The third mapping table Table_3 may be stored in the system region of the memory device 120.

According to an embodiment of the invention, the fields of the second mapping table Table_2 are grouped into a plurality of groups. For example, the $1^{st}$~$1024^{th}$ fields of the second mapping table Table_2 may be grouped into the first group, the $1025^{th}$~$2048^{th}$ fields of the second mapping table Table_2 may be grouped into the second group, and so on. In another example, the $1^{st}$~$4096^{th}$ fields of the second mapping table Table_2 may be grouped into the first group, the $4097^{th}$~$8192^{th}$ fields of the second mapping table Table_2 may be grouped into the second group, and so on. According to an embodiment of the invention, the number of fields comprised in one group may be determined according to the number of fields of the second mapping table Table_2 that can actually be stored in one physical page. For example, suppose that one physical page can record the mapping information of 4K fields, each 4K fields may be grouped into one group, such as the aforementioned example in which the $1^{st}$~$4096^{th}$ fields of the second mapping table Table_2 are grouped into the first group, the $4097^{th}$~$8192^{th}$ fields of the second mapping table Table_2 are grouped into the second group, and so on. In this manner, the mapping information recorded in the fields of the second mapping table that belong to different groups will be stored in different physical pages.

According to an embodiment of the invention, the third mapping table Table_3 comprises a plurality of fields. One field of the third mapping table Table_3 corresponds to one group in the second mapping table Table_2. According to an embodiment of the invention, the third mapping table Table_3 records the management information in the form of an array. For example, suppose that a starting array index of the third mapping table is 0, the management information recorded in the first field Table_3[0] in the third mapping table Table_3 (that is, the first record stored in the third mapping table Table_3) is the management information of the first group in the second mapping table Table_2. Similarly, the management information recorded in the second field Table_3[1] in the third mapping table Table_3 (that is, the second record stored in the third mapping table Table_3) is the management information of the second group in the second mapping table Table_2, and so on. According to an embodiment of the invention, the management information recorded in the third mapping table Table_3 is the information indicating which memory block and which physical page of the memory device 120 the mapping information of the corresponding group is actually stored in. For example, each field of the third mapping table Table_3 may record a memory block number and a physical page number which stores the mapping information of a corresponding group.

According to an embodiment of the invention, the third mapping table Table_3 stored in the memory device 120 may also across a plurality of physical pages. For example, suppose one physical page can record the information of 4K fields as discussed above, for the memory device 120 having a capacity (that is, memory size) of 256 G Bytes, the size of the second mapping table Table_2 has to be maintained will be 256 MB, which is equal to 16384(16K) physical pages. In this manner, the size of the third mapping table Table_3 may be 4 physical pages (that is, dividing 16K by 4K).

According to an embodiment of the invention, when the memory controller 110 has to query mapping information stored in the second mapping table Table_2, the memory controller 110 may first query the third mapping table Table_3 to obtain the management information of the corresponding group, thereby knowing which memory block and which physical page of the memory device 120 the mapping information of the corresponding group in the second mapping table Table_2 that a specific field belongs to is stored in, where the specific field is the field that the memory controller 110 wants to query. Next, the memory controller 110 is configured to access the corresponding memory block and the corresponding physical page storing the mapping information of the corresponding group according to the management information, so as to obtain the required mapping information.

Figure 2:
FIG. 2 shows the exemplary mapping tables according to an embodiment of the invention.
Figure 3:
FIG. 3 shows the exemplary mapping tables according to an embodiment of the invention.

FIG. 2 and FIG. 3 respectively show the exemplary mapping tables according to an embodiment of the invention. In the embodiment of the invention, the first mapping table Table_1 is configured to record the P2L mapping information of each physical page of the predetermined memory block, that is, which logical page the data stored in each physical page of the predetermined memory block is directed to. The second mapping table Table_2 is configured to record the L2P mapping information of each logical page, that is, which memory block and which physical page the data of the corresponding logical page is directed to. In the figures, the number listed in the left hand side in each field of the second mapping table Table_2 may be the memory block number, and the number listed in the right hand side in each field of the second mapping table Table_2 may be the page number. The third mapping table Table_3 is configured to record the management information of each group in the second mapping table Table_2. As shown in FIG. 2 and FIG. 3, the memory block number and the page number recorded in the first field Table_3[0] in the third mapping table Table_3 indicates the position of the physical memory block and physical page where the data corresponding to the first group in the second mapping table Table_2 is actually stored. The memory block number and the page number recorded in the second field Table_3[1] in the third mapping table Table_3 indicates the position of the physical memory block and physical page where the data corresponding to the second group in the second mapping table Table_2 is actually stored, and so on. Similarly, in the figures, the number listed in the left hand side in each field of the third mapping table Table_3 may be the memory block number, and the number listed in the right hand side in each field of the third mapping table Table_3 may be the page number.

As discussed above, when the predetermined memory block is full, the memory controller 110 is configured to edit the second mapping table Table_2 according to the content recorded in the first mapping table Table_1, so as to update the latest mapping information to the second mapping table Table_2. In addition, when the management information of any group in the second mapping table Table_2 has to be updated, the memory controller 110 will also update the content of the corresponding field in the third mapping table Table_3.

According to an embodiment of the invention, in order to speed up the operation of editing the second mapping table Table_2, the memory controller 110 may selectively and temporarily skip the edit of a portion of fields of the second mapping table Table_2, such that the portion of fields of the second mapping table Table_2 will not be edited by the memory controller 110. For example, in the operation of editing or updating the content of the second mapping table Table_2 and the third mapping table Table_3 according to the content stored in the first mapping table Table_1 as discussed above, the memory controller 110 may compress the content that is supposed to be stored in second mapping table Table_2, and store the compressed content in the third mapping table Table_3 instead of storing it in the second mapping table Table_2. In this manner, the operation of editing the second mapping table Table_2 is skipped. According to an embodiment of the invention, the memory controller 110 may decompress the compressed content when required or in idle mode, and update or write the decompressed content back to the second mapping table Table_2. In this manner, the execution of a write operation (including the edition and update of the content of the mapping tables) of the memory controller 110 can be sped up.

Figure 4:
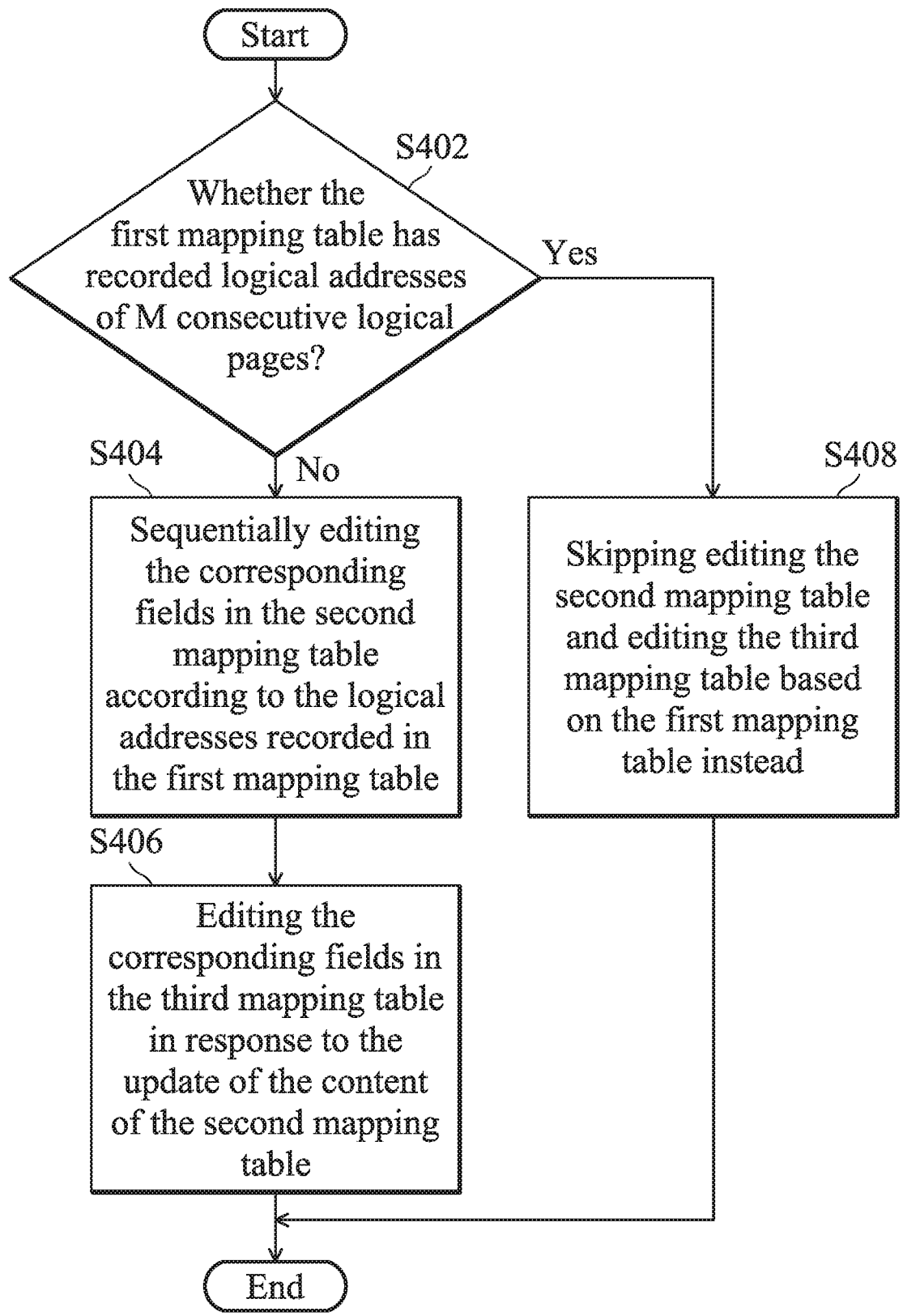
FIG. 4 is an exemplary flow chart of a data processing method according to an embodiment of the invention.

FIG. 4 is an exemplary flow chart of a data processing method according to an embodiment of the invention. According to an embodiment of the invention, when the memory controller 110 has to edit the second mapping table Table_2 or the third mapping table Table_3 based on the first mapping table Table_1, the memory controller 110 may determine whether the first mapping table has recorded logical addresses of a predetermined number (M) of consecutive logical pages (Step S402), where the predetermined number M is a positive integer greater than 1.

According to an embodiment of the invention, the memory controller 110 may determine whether the first mapping table Table_1 has recorded logical addresses of M consecutive logical pages in M consecutive fields, thereby determining whether there is any data being consecutively written in the predetermined memory block (that is, the buffer). According to an embodiment of the invention, the starting field index or the end field index of the M consecutive fields is preferably an integer multiple of M.

For example, the memory controller 110 may check the content stored in the first mapping table Table_1 to determine whether there are M consecutive logical addresses recorded in M consecutive fields of the first mapping table Table_1. When the logical addresses recorded in M consecutive fields of the first mapping table Table_1 are consecutive logical addresses, the memory controller 110 can determine that the first mapping table has recorded logical addresses of M consecutive logical pages. In another example, there may be a hardware device (not shown in the figure) configured inside of the data storage device 100 and being configured to check whether there are any consecutive logical addresses recorded in the mapping table. If so, the hardware device may further provide information regarding the starting field index (for example, the array index) and the end field index of the fields recording the consecutive logical addresses, the starting address and the end address of the consecutive logical addresses, the range of the consecutive logical addresses, or the like, to the memory controller 110. Based on the information, the memory controller 110 may determine whether the first mapping table Table_1 has recorded the logical addresses of M consecutive logical pages.

When the memory controller 110 determines that the first mapping table has not recorded logical addresses of the predetermined number (M) of consecutive logical pages, the memory controller 110 may sequentially edit the corresponding fields in the second mapping table Table_2 according to the logical addresses recorded in the first mapping table Table_1 (Step S404) and edit the corresponding fields in the third mapping table Table_3 in response to the content update of the second mapping table Table_2 (Step S406). The operation of editing the second mapping table Table_2 may comprise recording the memory block number of the predetermined memory block and a corresponding array index of the first mapping table Table_1 in the corresponding field in the second mapping table Table_2, so as to update the latest (that is, the most recently updated) L2P information to the second mapping table Table_2 according to the first mapping table Table_1. The operation of editing the third mapping table Table_3 may comprise recording the management information (that is, which memory block and which physical page of the memory device 120 the mapping information of the corresponding group is stored in) of the group in the second mapping table Table_2 whose content has been updated in the corresponding field of the third mapping table Table_3, so that the field of the third mapping table Table_3 can direct to the latest and valid content of the second mapping table Table_2.

When the memory controller 110 determines that the first mapping table Table_1 has recorded logical addresses of the predetermined number (M) of consecutive logical pages, the memory controller 110 may skip the editing of the second mapping table Table_2 and edit the third mapping table Table_3 based on the first mapping table Table_1 instead (Step S408), so as to record the mapping information of a predetermined logical page among the predetermined number (M) of consecutive logical pages as representative mapping information in a corresponding field of the third mapping table Table_3. In other words, when the memory controller 110 determines that the first mapping table has recorded logical addresses of the predetermined number (M) of consecutive logical pages, the memory controller 110 does not record the mapping information of the predetermined number (M) of consecutive logical pages in the second mapping table Table_2.

According to an embodiment of the invention, the representative mapping information is the compressed content obtained by compressing the content that is supposed to be stored in second mapping table Table_2 as discussed above. To be more specific, according to an embodiment of the invention, the memory controller 110 may use this representative mapping information to represent the mapping information of the M consecutive logical pages that have not been updated to the second mapping table Table_2 due to the skip of editing the second mapping table Table_2. Via the representative mapping information, the memory controller 110 may derive (decompress) the original mapping information of the M consecutive logical pages.

According to an embodiment of the invention, when the memory controller 110 edits the third mapping table Table_3 based on the first mapping table Table_1, the memory controller 110 replaces the management information of the group corresponding to the predetermined number (M) of consecutive logical pages with the representative mapping information. In other words, for this group, the content stored in the corresponding field of the third mapping table Table_3 is no longer the management information thereof (that is, which memory block and which physical page of the memory device 120 the mapping information of this group is stored in). Instead, the content stored in the corresponding field of the third mapping table Table_3 is the mapping information of the predetermined logical page (that is, which memory block and which physical page of the memory device 120 the data of the predetermined logical page is stored in).

According to an embodiment of the invention, the predetermined number M may be set as the number of fields comprised in one group in the second mapping table Table_2, or, may be set to the number of fields of the second mapping table Table_2 that can be recorded in one physical page. Since the data compression rate (1/M) is related to the number of fields comprised in one group in the second mapping table Table_2, the compressed content recorded in the third mapping table Table_3 is sufficient to represent the content of the whole group that should be stored in second mapping table Table_2. For example, the predetermined number M may be set to 4K or 4096.

According to an embodiment of the invention, the data compression mechanism adopted by the memory controller 110 when compressing the content that is supposed to be stored in second mapping table Table_2 may be that, selecting the first logical page of the predetermined number (M) of consecutive logical pages as the aforementioned predetermined logical page. Therefore, the mapping information of the first logical page of the predetermined number (M) is the representative mapping information that can represent the mapping information of the predetermined number (M) of consecutive logical pages. It should be noted that the data compression mechanism adopted by the memory controller 110 is not limited thereto. For example, the memory controller 110 may select any logical page among the predetermined number (M) of consecutive logical pages as the aforementioned predetermined logical page, and use the mapping information of the selected logical page as the representative mapping information for representing the predetermined number (M) of consecutive logical pages.

Figure 5:
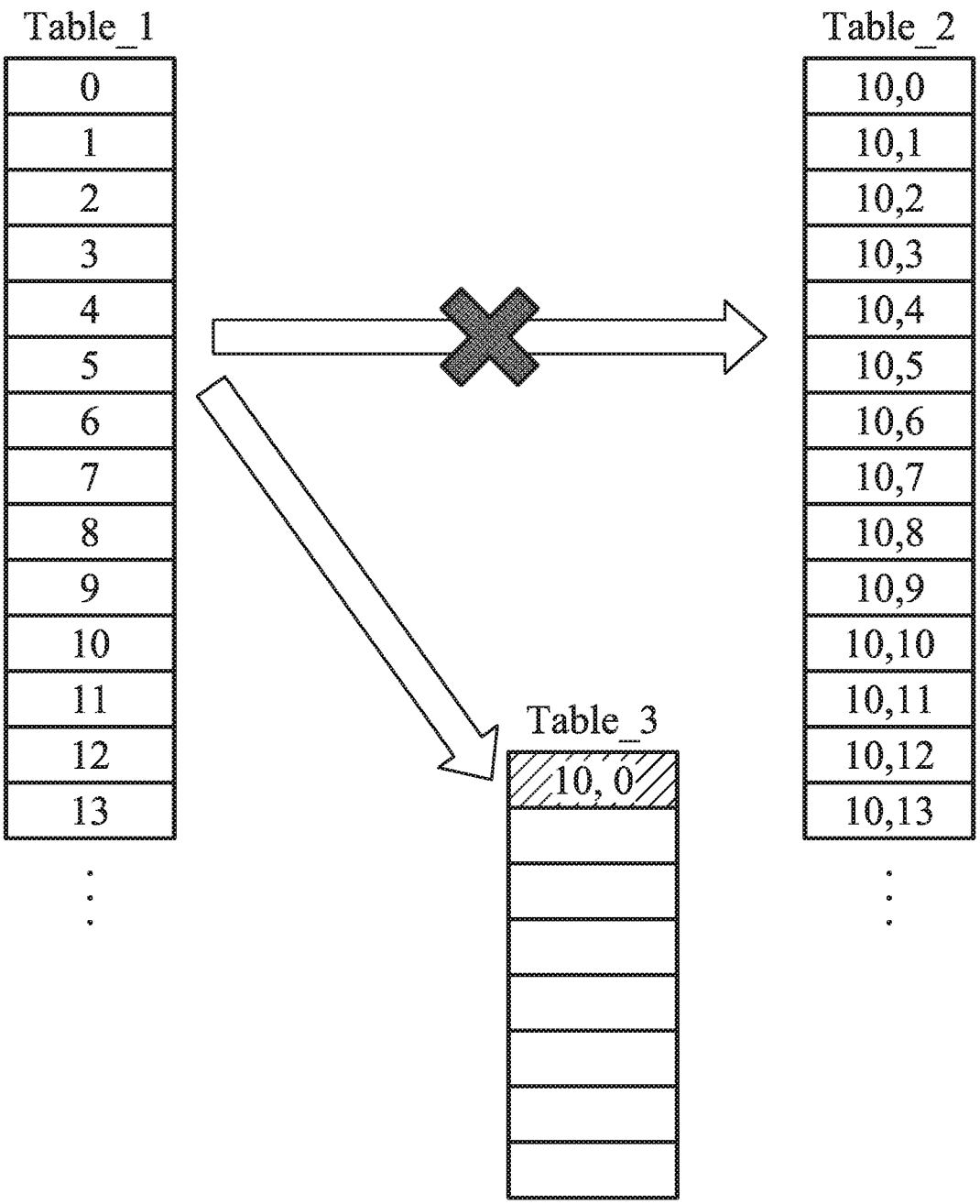
FIG. 5 shows the exemplary mapping tables according to an embodiment of the invention.

FIG. 5 shows the exemplary mapping tables according to an embodiment of the invention. FIG. 5 shows a case when a field of the third mapping table Table_3 records the representative mapping information of the corresponding group instead of the management information thereof. In this embodiment, suppose that the memory controller 110 determines that the first mapping table Table_1 has recorded the logical addresses of the predetermined number (M) of consecutive logical pages, the memory controller 110 does not record the mapping information of the predetermined number (M) of consecutive logical pages in the second mapping table Table_2, but compresses the content that is supposed to be stored in second mapping table Table_2 and stores the compressed content in the third mapping table Table_3 instead. As shown in FIG. 5, the memory controller 110 selects the first logical page of the predetermined number (M) of consecutive logical pages as the aforementioned predetermined logical page. Therefore, the mapping information (10,0) of the first logical page is the representative mapping information of the predetermined number (M) of consecutive logical pages. The representative mapping information (10,0) will be stored in a corresponding field in the third mapping table Table_3. For example, if the predetermined number (M) of consecutive logical pages currently being processed belong to the first group in the second mapping table Table_2, the representative mapping information (10,0) of the first group in the second mapping table Table_2 will be stored in the first field Table_3[0] of the third mapping table Table_3.

Figure 6:
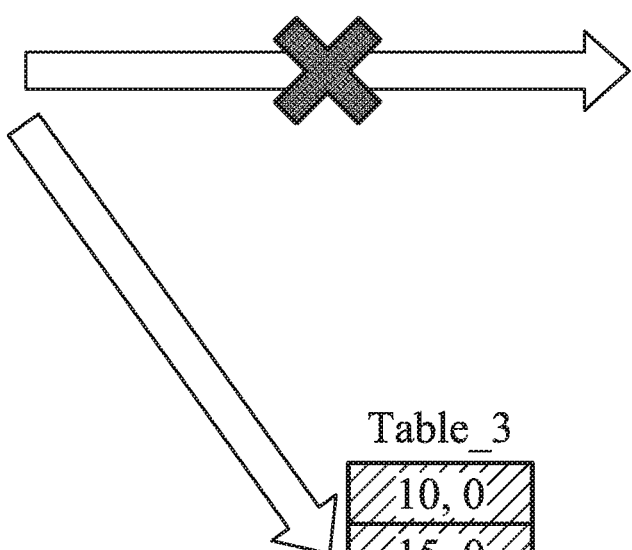
FIG. 6 shows the exemplary mapping tables according to another embodiment of the invention.

FIG. 6 shows the exemplary mapping tables according to another embodiment of the invention. FIG. 6 shows another case when a field of the third mapping table Table_3 records the representative mapping information of the corresponding group instead of the management information thereof. In this embodiment, since the memory controller 110 determines that the first mapping table Table_1 has recorded the logical addresses of the predetermined number (M) of consecutive logical pages, and the predetermined number (M) of consecutive logical pages currently being processed belong to the second group in the second mapping table Table_2, the content (15,0) recorded in the second field Table_3[1] of the third mapping table Table_3 is the representative mapping information of the second group in the second mapping table Table_2, not the management information of the second group in the second mapping table Table_2.

According to an embodiment of the invention, each field of the third mapping table Table_3 may comprise a plurality of bits. For example, suppose that the size required by each field of the third mapping table Table_3 is 4 Bytes, each field may comprise 32 bits to store the corresponding data. According to an embodiment of the invention, at least one bit (for example, a compression indication bit Comp_Ind) in each field of the third mapping table Table_3 is used to indicate whether the mapping information of the corresponding group in the second mapping table Table_2 has been compressed. As discussed above, in an embodiment of the invention, when the L2P mapping information of M consecutive logical page comprised in one group in the second mapping table Table_2 contains consecutive physical addresses (that is, the first mapping table Table_1 has recorded logical addresses of M consecutive logical pages in M consecutive fields), the corresponding field of the third mapping table Table_3 may be utilized to store the compressed mapping information of the corresponding group, not the management information of the corresponding group.

To be more specific, in an embodiment of the invention, if a compression indication bit Comp_Ind indicates that the mapping information of the corresponding group (that is, the group in the second mapping table Table_2 corresponding to a field of the third mapping table Table_3 comprising this compression indication bit Comp_Ind) has been compressed, the other bits of the field comprising this compression indication bit Comp_Ind are utilized to record the representative mapping information of the corresponding group. On the other hand, when the compression indication bit Comp_Ind indicates that the mapping information of the corresponding group has not been compressed, the other bits of the field comprising this compression indication bit Comp_Ind are utilized to record the management information of the corresponding group. Comparing FIG. 2 and FIG. 3 with FIG. 5 and FIG. 6, the fields storing the management information of the corresponding group and the fields storing the representative mapping information of the corresponding group are labeled by different patterns, so as to distinguish the management information from the representative mapping information.

It should be noted that the invention should not be limited to only use the bit (for example, the aforementioned compression indication bit Comp_Ind) comprised in each field of the third mapping table Table_3 to indicate whether the mapping information of the corresponding group has been compressed or not. In another embodiment of the invention, the memory controller 110 may also record the compression information of each field in the spare region of each physical page of the third mapping table Table_3, so as to indicate whether the mapping information of the corresponding group in the second mapping table Table_2 has been compressed or not. In addition, according to yet another embodiment of the invention, the memory controller 110 may also establish a bit table, where the number of fields comprised in the bit table is related to the number of fields comprised in the third mapping table Table_3, and the field in the bit table has a one-to-one mapping relationship with the field in the third mapping table Table_3. In addition, the field in the bit table also has a one-to-one mapping relationship with the group in the second mapping table Table_2. Each field of the bit table may comprise at least one bit to indicate whether the mapping information of the corresponding group in the second mapping table Table_2 has been compressed or not. For simplicity, the compression indication bit Comp_Ind will still be utilized in the following paragraphs for illustration. However, as discussed above, the invention should not be limited to such implementation method.

According to an embodiment of the invention, when the memory controller 110 has to access a specific field of the second mapping table Table_2 in response to a read command, the memory controller 110 is configured to determine which group in the second mapping table Table_2 the specific field belongs to. For example, the value of the filed index of the specific field or the logical address corresponding to the specific field may be divided by the number of fields that can be comprised in one group, and the obtained calculation result can indicate which group in the second mapping table Table_2 the specific field belongs to. For example, the memory controller 110 may divide the logical address by the number of fields that can be comprised in one group, and the obtained quotient is the number (or index) of the group.

After knowing which group in the second mapping table Table_2 the specific field belongs to, the memory controller 110 may further look up the value of the compression indication bit Comp_Ind of the field corresponding to this group in the third mapping table Table_3 to determine whether the mapping information of the group that the specific field belongs to has been compressed.

When the memory controller 110 determines that the mapping information of the group that the specific field belongs to has not been compressed, the memory controller 110 may first access the other bits in the corresponding field in the third mapping table Table_3 to obtain the management information of the group that the specific field belongs to (that is, which memory block and which physical page of the memory device 120 the mapping information of the corresponding group is stored in). Next, the memory controller 110 may access the memory block and the physical page storing the mapping information of the corresponding group according to the obtained management information, and find out what the required mapping information of the corresponding logical page is according to the field index (or the number of the field, or the corresponding logical address) of the specific field.

On the other hand, when the memory controller 110 determines that the mapping information of the group that the specific field belongs to has been compressed, the memory controller 110 may access the other bits in the corresponding field in the third mapping table Table_3 to obtain the representative mapping information of the group that the specific field belongs to. Next, the memory controller 110 is configured to derive the mapping information corresponding to the specific field according to the representative mapping information stored in the corresponding field in the third mapping table Table_3.

To be more specific, suppose that the memory controller 110 has to read the data of logical address 65 in response to a read command, the memory controller 110 has to access a specific field, such as the $66^{th}$ field of the second mapping table Table_2 (wherein suppose that the starting array index is 0 and the starting logical address is also 0, the field index=65), to obtain the required mapping information. The memory controller 110 may first divide 65 by 4096 (suppose that the number of fields comprised in one group is 4096) and the obtained quotient is the value indicating which group in the second mapping table Table_2 this specific logical address belongs to (for example, the obtained quotient 0 indicates the number or index of the group, that is, the first group, where in this example, the logical addresses 0~4095 belongs to the first group, the logical addresses 4096~8191 belongs to the second group, and so on), and the obtained remainder indicates the offset of this specific logical address in the corresponding group.

Next, the memory controller 110 may look up the content stored in the corresponding field of the third mapping table Table_3 (for example, the first group in the second mapping table Table_2 may correspond to the first field Table_3[0] of the third mapping table Table_3), read the values of the other bits of this field to obtain the representative mapping information of the first group in the second mapping table Table_2. Next, the memory controller 110 may further derive the mapping information corresponding to this specific logical address according to the representative mapping information of the first group and the offset of this specific logical address in the first group. For example, when the compression mechanism adopted by the memory controller 110 is to store the mapping information of the first logical address comprised in a group as the representative mapping information of this group, and the memory controller 110 knows that the representative mapping information of first group is (10,0) by accessing the values of the other bits of first field in third mapping table Table_3, the memory controller 110 can know that the data of logical address 65 is stored in the memory block having the memory block number as 10. Next, the memory controller 110 adds the offset 65 to the physical page number 0 of the obtained representative mapping information and knows that the data of logical address 65 is stored in the physical page having the physical page number 65 (that is, the $66^{th}$ page of the memory block having the memory block number as 10).

In other words, according to an embodiment of the invention, when the mapping information of a group has been compressed, the memory controller 110 does not have to access the second mapping table Table_2 to obtain the required mapping information. Instead, the memory controller 110 only has to access the third mapping table Table_3 to obtain the compressed mapping information, and derive the required mapping information according to the compressed mapping information.

It should be noted that the aforementioned method of deriving the required mapping information may be adjusted based on the compression mechanism adopted by the memory controller 110. For example, when compression mechanism adopted by the memory controller 110 is to store the mapping information of the last logical address comprised in a group as the representative mapping information of this group, the memory controller 110 is configured to subtract the offset from the physical page number of the obtained representative mapping information to derive the mapping information of the specific logical address.

According to an embodiment of the invention, when the memory controller 110 has to update the mapping information of at least one specific logical page in response to a write operation, the memory controller 110 may determine which group in the second mapping table Table_2 the specific logical page belongs. For example, the memory controller 110 may divide the specific logical address corresponding to the specific logical page by the number of fields comprised in one group, and the obtained quotient is the value indicating which group in the second mapping table Table_2 this specific logical address belongs to. After knowing which group in the second mapping table Table_2 the specific logical page belongs to, the memory controller 110 may further look up the value of the compression indication bit Comp_Ind in the field corresponding to this group in the third mapping table Table_3 to determine whether the mapping information of the group that the specific logical page belongs to has been compressed.

When the memory controller 110 determines that the mapping information of the group that the specific logical page belongs to has not been compressed, the memory controller 110 may first access the other bits in the corresponding field in the third mapping table Table_3 to obtain the management information of the group that the specific logical page belongs to (that is, which memory block and which physical page of the memory device 120 the mapping information of the corresponding group is stored in). Next, the memory controller 110 may access the memory block and the physical page storing the mapping information of the corresponding group according to the obtained management information, and find out what the required mapping information of the specific logical page is according to the specific logical address.

On the other hand, when the memory controller 110 determines that the mapping information of the group that the specific logical page belongs to has been compressed, the memory controller 110 may access the other bits in the corresponding field of the third mapping table Table_3 to obtain the representative mapping information of the group that the specific logical page belongs to. Next, the memory controller 110 is configured to derive the mapping information, which has not been edited in the second mapping table Table_2 due to the skip of editing the second mapping table Table_2, of the group that the specific logical page belongs to according to the representative mapping information stored in the corresponding field in the third mapping table Table_3, and edit the second mapping table Table_2 according to the derived mapping information and the mapping information of the specific logical page that has to be updated.

It should be noted that once the mapping information corresponding to one logical page has to be modified or updated, the compressed mapping information can no longer be the representative mapping information of the corresponding group that it belongs to. Therefore, when the mapping information of at least one logical page has to be modified or updated, the memory controller 110 has to decompress the compressed mapping information.

To be more specific, suppose that the memory controller 110 has to update the mapping information of the logical pages having logical addresses 4096~4224 in response to a write operation, the memory controller 110 may first divide the logical address 4096 by 4096 (suppose that the number of fields comprised in one group is 4096) and the obtained quotient is the value indicating which group in the second mapping table Table_2 this specific logical address belongs to (for example, the obtained quotient 1 is the number or index of the group, that is, the second group, where in this example, the logical addresses 0~4095 belongs to the first group, the logical addresses 4096~8191 belongs to the second group, and so on), and the obtained remainder indicates the offset of this logical address in the corresponding group.

Next, the memory controller 110 may look up the content of the corresponding field of the third mapping table Table_3 (for example, the second group in the second mapping table Table_2 corresponds to the second field Table_3[1] of the third mapping table Table_3), read the values of the other bits of this field to obtain the representative mapping information of the second group in the second mapping table Table_2. Next, the memory controller 110 may further derive the mapping information corresponding to a logical address according to the representative mapping information of the second group and the offset of this logical address in the second group. In this example, since the mapping information of the logical pages having logical addresses 4096~4224 has to be updated, the memory controller 110 has to derive the mapping information of the remaining logical addresses in the second group (for example, the mapping information of the logical pages having logical addresses 4225~8191), and then edit the second mapping table Table_2 according to the derived mapping information of the logical addresses 4225~8191 and the mapping information of logical addresses 4096~4224 that have to be updated, so that the content of the second mapping table Table_2 will be updated to the latest L2P mapping information.

In other words, according to an embodiment of the invention, when the mapping information of a group has been compressed, the memory controller 110 does not need to access the second mapping table Table_2. By only accessing the third mapping table Table_3, the memory controller 110 can obtain the compressed mapping information and then derive the required mapping information according to the compressed mapping information.

It should be noted that, in the aforementioned embodiment, the way to derive the mapping information of the logical addresses 4225~8191 may refer to the other embodiment as illustrated above, and will not be illustrated here for brevity. In addition, it should be noted that the way to derive the mapping information may be flexibly adjusted according to the compression mechanism adopted by the memory controller 110, and shall not be limited to the method as illustrated above.

In the embodiments of the invention, since the compression originates from the condition when a predetermined memory block has stored the data of a plurality of consecutive logical pages in a plurality of consecutive physical pages, the memory controller 110 can derive the mapping information of a plurality of fields that has not been edited due to the compression and the skip of editing the second mapping table by simply increasing or decreasing the representative mapping information of the corresponding group. Therefore, the operations of deriving the mapping information of the memory controller 110 will not be further described for brevity.

Besides the aforementioned embodiments, according to an embodiment of the invention, the memory controller 110 may also determine whether the data storage device 100 is idle, and may perform the decompression of the mapping information in the background when the data storage device 100 is idle, so as to restore the mapping information that has not been edited in the second mapping table Table_2 due to the skip of editing the second mapping table Table_2. In addition, the memory controller 110 may further update the decompressed (restored) content of the second mapping table Table_2 that is buffered in the buffer memory 116 to the system region of the memory device 120 in the background. In this manner, the second mapping table Table_2 in the memory device 120 stores the latest mapping information.

To be more specific, according to an embodiment of the invention, when the data storage device 100 is idle, the memory controller 110 is configured to derive the mapping information corresponding to one or more fields that have not been edited in the second mapping table Table_2 due to the skip of editing the second mapping table Table_2, according to the representative mapping information stored in the corresponding field in the third mapping table Table_3 in the background, update the second mapping table Table_2 according to the derived mapping information, and record the management information of one or more corresponding groups in the corresponding fields of the third mapping table Table_3 in response to the updating of the second mapping table Table_2 and set the corresponding compression indication bit Comp_Ind accordingly, so that the compression indication bit Comp_Ind can correctly indicate whether the mapping information of the corresponding group in the second mapping table Table_2 has been compressed or not. Since the third mapping table Table_3 does not store the compressed mapping information after restoring the mapping information, the compression indication bit Comp_Ind in the corresponding field of the third mapping table Table_3 should be reset to indicate that the mapping information of the corresponding group in the second mapping table Table_2 has not been compressed. That is, the compression indication bit Comp_Ind in the corresponding field of the third mapping table Table_3 should correctly indicate that the content stored in the corresponding field of the third mapping table Table_3 is the management information of the corresponding group, not the representative mapping information of the corresponding group anymore.

Figure 7:
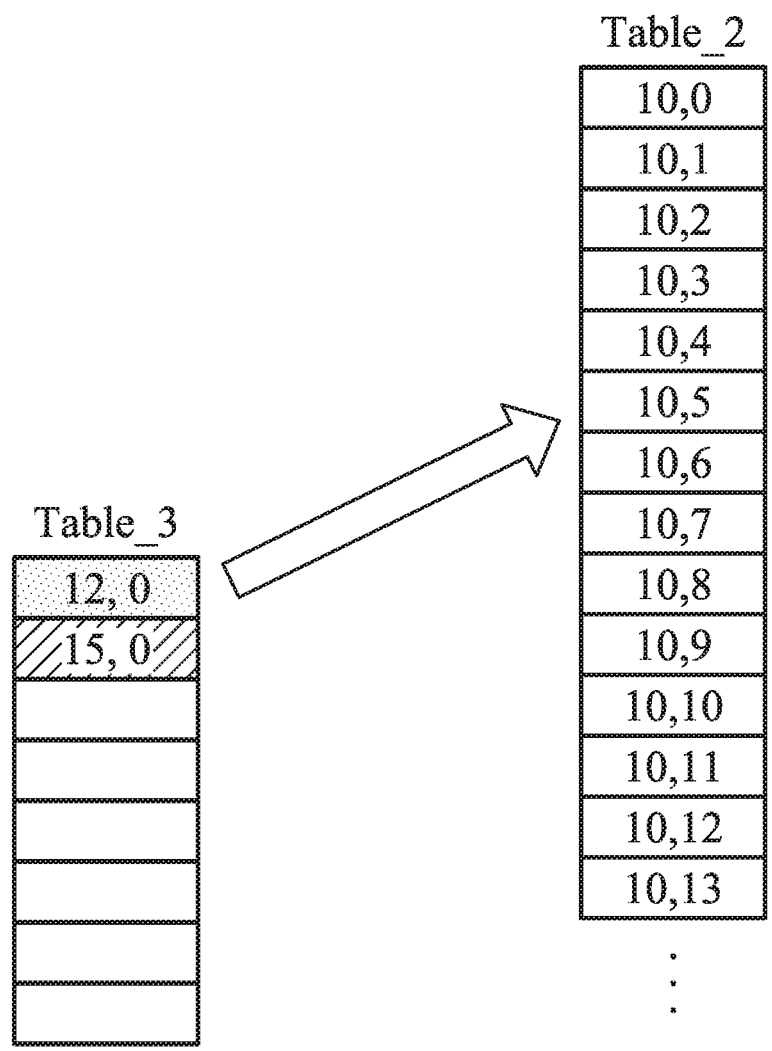
FIG. 7 shows the exemplary mapping tables according to an embodiment of the invention.
Figure 8:
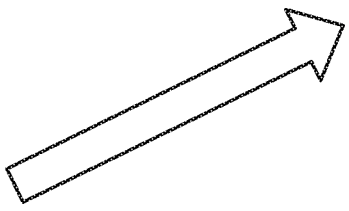
FIG. 8 shows the exemplary mapping tables according to an embodiment of the invention.

FIG. 7 and FIG. 8 show the exemplary mapping tables according to an embodiment of the invention, for illustrating the embodiment of restoring the mapping information that has not been edited in the second mapping table Table_2 due to the skip of editing the second mapping table Table_2 according to the representative mapping information recorded in the third mapping table Table_3. As shown in FIG. 7 and FIG. 8, the memory controller 110 may sequentially restore the content that is supposed to be recorded in the second mapping table Table_2 according to the representative mapping information recorded in the first field and the second field of the third mapping table Table_3. After the restore operation is completed, the first field and the second field of the third mapping table Table_3 are changed to store the management information of the corresponding group and the corresponding compression indication bit Comp_Ind is reset a value to indicate that the mapping information of the corresponding group has not been compressed. Comparing FIG. 7 and FIG. 8, the fields storing the management information of the corresponding group and the fields storing the representative mapping information of the corresponding group are labeled by different patterns, so as to distinguish the management information from the representative mapping information and show different statuses when the compression indication bit Comp_Ind is set to different values.

As discussed above, via the application illustrated in the aforementioned embodiments, the memory controller may set the number M of consecutive logical addresses that have to be compressed based on the system requirement, and may skip the edit operation of a large portion of fields via the compression operation illustrated above and only write the representative mapping information in the third mapping table Table_3 to replace the management information that is supposed to be stored therein. In this manner, the execution of the write operation (including the edition and update of the content of the mapping tables) of the memory controller 110 can be sped up. Since the edit operations of a large portion of fields of the second mapping table Table_2 are skipped at the time when executing the corresponding write operation, the execution of the write operation can be significantly sped up, especially when the host device 130 is configured to write a large amount of consecutive data to the memory device 120. In addition, the memory controller 110 may restore or decompress the content of the second mapping table Table_2 when required or in idle mode, and may further update the restored mapping information to the memory device 120 to facilitate access to the second mapping table Table_2 in the future.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A data storage device, comprising:
a memory device, comprising a plurality of memory blocks, each memory block comprising a plurality of physical pages; and
a memory controller, coupled to the memory device and configured to access the memory device, wherein the memory controller is configured to select a predetermined memory block to receive data and accordingly record a plurality of logical addresses in a first mapping table,
wherein the memory controller comprises a buffer memory, the first mapping table is stored in the buffer memory and records which logical page the data stored in each physical page of the predetermined memory block is directed to,
when the predetermined memory block is full, the memory controller is configured to edit a second mapping table or a third mapping table based on the first mapping table, wherein the second mapping table corresponds to a plurality of logical pages and records mapping information of the corresponding logical pages,
wherein the memory controller further determines whether the first mapping table has recorded logical addresses of a predetermined number of consecutive logical pages,
when the memory controller determines that the first mapping table has not recorded the logical addresses of the predetermined number of consecutive logical pages, the memory controller is configured to edit the second mapping table based on the first mapping table, and
when the memory controller determines that the first mapping table has recorded the logical addresses of the predetermined number of consecutive logical pages, the memory controller is configured to skip editing of the second mapping table and edit the third mapping table based on the first mapping table instead, so as to record the mapping information of a predetermined logical page among the predetermined number of consecutive logical pages as representative mapping information in a corresponding field of the third mapping table,
wherein the second mapping table comprises a plurality of fields, one field of the second mapping table is configured to record the mapping information of one logical page, the fields of the second mapping table are grouped into a plurality of groups, and the third mapping table is configured to record management information of the groups of the second mapping table, and
wherein when the memory controller is configured to edit the third mapping table based on the first mapping table, the memory controller is configured to replace the management information of the group corresponding to the predetermined number of consecutive logical pages with the representative mapping information, and wherein the predetermined number is a positive integer greater than 1.

2. The data storage device as claimed in claim 1, wherein when the memory controller skips editing the second mapping table, the memory controller does not record the mapping information of the predetermined number of consecutive logical pages in the second mapping table.

3. The data storage device as claimed in claim 1, wherein the mapping information recorded in the fields of the second mapping table that belong to different groups is stored in different physical pages, and the management information recorded in the third mapping table is the information indicating which memory block and which physical page the mapping information of the corresponding group is stored in.

4. The data storage device as claimed in claim 1, wherein the third mapping table comprises a plurality of fields, one field of the third mapping table corresponds to one group in the second mapping table, and each field of the third mapping table comprises a plurality of bits, wherein at least one bit in each field of the third mapping table is used to indicate whether the mapping information of the corresponding group has been compressed.

5. The data storage device as claimed in claim 4, wherein when the bit indicates that the mapping information of the corresponding group has been compressed, the other bits of the field comprising the bit are utilized to record the representative mapping information of the corresponding group, and when the bit indicates that the mapping information of the corresponding group has not been compressed, the other bits of the field comprising the bit are utilized to record the management information of the corresponding group.

6. The data storage device as claimed in claim 4, wherein when the memory controller has to access a specific field of the second mapping table in response to a read command, the memory controller is configured to determine which group in the second mapping table the specific field belongs to, and to look up the bit in a field corresponding to the group in the third mapping table to determine whether the mapping information of the group that the specific field belongs to has been compressed, and when the memory controller determines that the mapping information of the group that the specific field belongs to has been compressed, the memory controller is configured to derive the mapping information corresponding to the specific field according to the representative mapping information stored in the corresponding field in the third mapping table.

7. The data storage device as claimed in claim 4, wherein when the memory controller has to update the mapping information of at least one specific logical page in response to a write operation, the memory controller is configured to determine which group in the second mapping table the specific logical page belongs to and to look up the bit in a field corresponding to the group in the third mapping table to determine whether the mapping information of the group that the specific logical page belongs to has been compressed, and when the memory controller determines that the mapping information of the group that the specific logical page belongs to has been compressed, the memory controller is further configured to derive the mapping information, which has not been edited in the second mapping table due to the skip of editing the second mapping table, corresponding to the group that the specific logical page belongs to according to the representative mapping information stored in the corresponding field in the third mapping table, and to edit the second mapping table according to the derived mapping information and the mapping information of the specific logical page that has to be updated.

8. The data storage device as claimed in claim 1, wherein the memory controller is further configured to determine whether the data storage device is idle, and when the data storage device is idle, the memory controller is configured to derive the mapping information corresponding to the fields that have not been edited in the second mapping table due to the skip of editing the second mapping table, according to the representative mapping information stored in the corresponding field in the third mapping table in the background, to update the second mapping table according to the derived mapping information, and to record the management information of one or more corresponding groups in the third mapping table in response to the updating of the second mapping table.

9. A data processing method for a data storage device, wherein the data storage device comprises a memory device and a memory controller, the memory device comprises a plurality of memory blocks, each memory block comprises a plurality of physical pages, the memory controller is coupled to the memory device and configured to access the memory device, and the method is performed by the memory controller and comprises:
  selecting a predetermined memory block to receive data and accordingly record a plurality of logical addresses in a first mapping table, wherein the first mapping table is stored in a buffer memory of the memory controller and records which logical page the data stored in each physical page of the predetermined memory block is directed to; and
  when the predetermined memory block is full, editing a second mapping table or a third mapping table based on the first mapping table, wherein the second mapping table corresponds to a plurality of logical pages and records mapping information of the corresponding logical pages,
  wherein the step of editing a second mapping table or a third mapping table based on the first mapping table further comprises:
  determining whether the first mapping table has recorded logical addresses of a predetermined number of consecutive logical pages;
  when the first mapping table has not recorded the logical addresses of the predetermined number of consecutive logical pages, editing the second mapping table based on the first mapping table; and
  when the first mapping table has recorded the logical addresses of the predetermined number of consecutive logical pages, skip editing of the second mapping table and edit the third mapping table based on the first mapping table instead, so as to record the mapping information of a predetermined logical page among the predetermined number of consecutive logical pages as representative mapping information in a corresponding field of the third mapping table,
  wherein the second mapping table comprises a plurality of fields, one field of the second mapping table records the mapping information of one logical page, the fields of the second mapping table are grouped into a plurality of groups, and the third mapping table records management information of the groups of the second mapping table, and
  wherein when editing the third mapping table based on the first mapping table, the management information of the group corresponding to the predetermined number of consecutive logical pages is replaced by the representative mapping information, and wherein the predetermined number is a positive integer greater than 1.

10. The data processing method as claimed in claim 9, wherein the mapping information of the predetermined number of consecutive logical pages is not recorded in the second mapping table when the editing of the second mapping table is skipped.

11. The data processing method as claimed in claim 9, wherein the mapping information recorded in the fields of the second mapping table that belong to different groups is stored in different physical pages, and the management information recorded in the third mapping table is the information indicating which memory block and which physical page the mapping information of the corresponding group is stored in.

12. The data processing method as claimed in claim 9, wherein the third mapping table comprises a plurality of fields, one field of the third mapping table corresponds to one group in the second mapping table, and each field of the third mapping table comprises a plurality of bits, at least one bit in each field of the third mapping table is used to indicate whether the mapping information of the corresponding group has been compressed.

13. The data processing method as claimed in claim 12, wherein when the bit indicates that the mapping information of the corresponding group has been compressed, the other bits of the field comprising the bit are utilized to record the representative mapping information of the corresponding group, and when the bit indicates that the mapping information of the corresponding group has not been compressed, the other bits of the field comprising the bit are utilized to record the management information of the corresponding group.

14. The data processing method as claimed in claim 12, wherein when a specific field of the second mapping table has to be accessed in response to a read command, the method further comprises:
  determining which group in the second mapping table the specific field belongs to, and looking up the bit in a field corresponding to the group in the third mapping table to determine whether the mapping information of the group that the specific field belongs to has been compressed; and
  when the mapping information of the group that the specific field belongs to has been compressed, deriving the mapping information corresponding to the specific field according to the representative mapping information stored in the corresponding field in the third mapping table.

15. The data processing method as claimed in claim 12, wherein when the mapping information of at least one specific logical page has to be updated in response to a write operation, the method further comprises:
  determining which group in the second mapping table the specific logical page belongs to, and looking up the bit in a field corresponding to the group in the third mapping table to determine whether the mapping information of the group that the specific logical page belongs to has been compressed; and when the mapping information of the group that the specific logical page belongs to has been compressed, deriving the mapping information, which has not been edited in the second mapping table due to the skip of editing the second mapping table, corresponding to the group that the specific logical page belongs to according to the representative mapping information stored in the corresponding field in the third mapping table, and editing the second mapping table according to the derived mapping information and the mapping information of the specific logical page that has to be updated.

16. The data processing method as claimed in claim 9, further comprising:

when the data storage device is idle, deriving the mapping information corresponding to the fields that have not been edited in the second mapping table due to the skip of editing the second mapping table, according to the representative mapping information stored in the corresponding field in the third mapping table in the background and updating the second mapping table according to the derived mapping information; and recording the management information of one or more corresponding groups in the third mapping table in response to the updating of the second mapping table.

* * * * *